Aug. 7, 1956 W. R. SLIVKA ET AL 2,757,902
NON-TWISTED ROTOR BLADE TURBINE
Filed May 22, 1952

Inventors
William R. Slivka and
David H. Silvern
By F. Schmitt
Walter S. Pawl
Attorneys

United States Patent Office 2,757,902
Patented Aug. 7, 1956

2,757,902

NON-TWISTED ROTOR BLADE TURBINE

William R. Slivka and David H. Silvern,
Cuyahoga County, Ohio

Application May 22, 1952, Serial No. 289,417

1 Claim. (Cl. 253—78)

(Granted under Title 35, U. S. Code (1952), sec. 266)

The invention described herein may be manufactured and used by or for the Government of the United States of America for governmental purposes without the payment of any royalties thereon or therefor.

The present invention relates to turbines having a stator and rotor blades and more particularly to turbine structure in which the stator blades are twisted and the rotor blades are non-twisted.

Prior to the present invention the practice was to use either twisted rotor blades or non-twisted rotor blades with non-twisted stator blades. This earlier use of non-twisted rotor blades was in early steam turbine designs in which radial variation in flow conditions were disregarded with resultant loss of efficiency.

Structures with twisted rotor blades are very difficult to manufacture because of the close tolerances required, the high stresses involved, and the high operating temperature, and particularly so when internal rotor blade cooling must be provided. These structural problems are greatly simplified by the present invention in which the rotor blades are non-twisted for simplicity in fabrication and the stator blades are twisted from the hub to the tip to keep losses low and the efficiency of the turbine assembly high as compared to that of a turbine having non-twisted stator blades and non-twisted rotor blades.

An object of the present invention is the provision of a simplified form of rotor blade which is easier to fabricate.

A further object of the invention is the provision of a twisted stator blade arranged to produce low losses when used with the non-twisted rotor blade.

Figure 1:
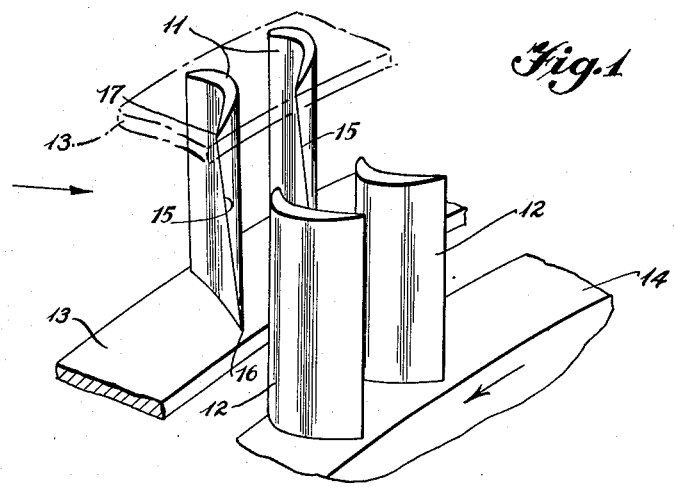
Figure 2:
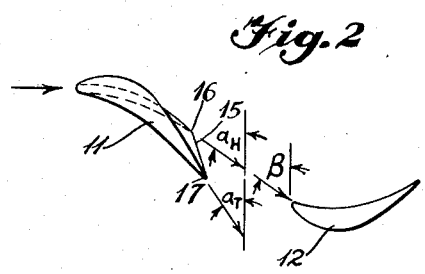

With these and other objects in view, as will hereinafter more fully appear, and which will be more particularly pointed out in the appended claim, reference is now made to the following description taken in connection with the accompanying drawings, in which:

Fig. 1 shows a schematic perspective view of a segment of the rotor and stator assemblies of a turbine embodying the instant invention, and Fig. 2 is a diagrammatic plan view showing the relative disposition of a typical stator blade and a typical rotor blade arranged according to the teachings of the instant invention.

Referring now to the drawings, wherein like reference characters designate like or corresponding parts throughout the several views, there is shown in Fig. 1 twisted stator blades 11 fixedly mounted in the non-rotating stator element 13, and non-twisted rotor blades 12 fixedly mounted on a rotor 14. The trailing edge 15 of each stator blade is twisted from the hub 16 to the tip 17 as indicated in Fig. 1 and shown more specifically in Fig. 2, wherein the stator exit angle at the hub is designated $\alpha_H$, the stator exit angle at the tip is designated $\alpha_T$ and the rotor entrance angle is designated $\beta$. In fact, according to the present invention, the stator blades are twisted in a predetermined manner in accordance with the following formula:

$$\frac{d\alpha}{dr} = \frac{-1}{r} \frac{\tan \beta - \tan \alpha}{\sec^2 \alpha} \times \frac{2+\tan^2 \alpha}{1+\tan \beta \tan \alpha}$$

where:

$r$ is the radius $\alpha$ is the varying stator exit angle measured from the tangential or peripheral direction of rotation of the rotor and $\beta$ is the constant relative rotor entrance angle The stator exit angle variation as determined according to the above formula results in flow into a non-twisted rotor in a manner which results in low losses as compared with the results obtained with a non-twisted stator blade similarly employed.

The actual blade profiles are not part of the present invention because they are varied depending upon the specific application of a turbine in which they are being used. In some designs thick profiles are most desirable while in others thin profiles are more desirable. Irrespective of thickness of blade profile, any stator blade shaped according to this formula, or with small deviations from this formula to accomplish the same purpose, will yield exit air angle variation along its length (radial span) resulting in efficient operating flow conditions in a turbine in which the rotor entrance angle is constant along the length of the rotor blade.

In operation, the combination of twisted stator blades and non-twisted rotor blades described herein results in increased efficiency because the increasing twist of the stator blades toward their tips, i. e., outwardly from the rotor axis, produces an increased deflection of the flow to compensate for the increased velocity of the tips of the rotor blades, as compared to the hub ends, and to compensate for the decrease in gas velocities due to the radial pressure gradients.

Various modifications are contemplated and may obviously be resorted to by those skilled in the art without departing from the spirit and scope of the invention, as hereinafter defined by the appended claim.

Having thus described the invention, what is claimed is:

In a turbine, the combination including a rotor rotatably mounted immediately behind a stator, a plurality of radially extending rotor blades having constant entrance and exit angles along their length and secured to said rotor, and a plurality of radially extending stator blades having gradually decreasing exit angles along their length outwardly from the rotor axis.

References Cited in the file of this patent

UNITED STATES PATENTS

| | | |
|---|---|---|
| 1,475,267 | Junggren | Nov. 27, 1923 |
| 1,526,814 | Warren | Feb. 17, 1925 |
| 2,378,372 | Whittle | June 12, 1945 |

FOREIGN PATENTS

| | | |
|---|---|---|
| 602,530 | Great Britain | May 28, 1948 |